(12) United States Patent
Tanaka

(10) Patent No.: US 10,833,336 B2
(45) Date of Patent: Nov. 10, 2020

(54) MANUFACTURING METHOD OF SEPARATOR FOR FUEL CELL

(71) Applicant: TOYOTA JIDOSHA KABUSHIKI KAISHA, Toyota (JP)

(72) Inventor: Hideaki Tanaka, Gotemba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 133 days.

(21) Appl. No.: 16/050,388

(22) Filed: Jul. 31, 2018

(65) Prior Publication Data

US 2019/0044156 A1 Feb. 7, 2019

(30) Foreign Application Priority Data

Aug. 4, 2017 (JP) .................................. 2017-152032

(51) Int. Cl.
 *H01M 8/026* (2016.01)
 *H01M 8/0206* (2016.01)
 *H01M 8/0221* (2016.01)

(52) U.S. Cl.
 CPC ......... *H01M 8/026* (2013.01); *H01M 8/0206* (2013.01); *H01M 8/0221* (2013.01)

(58) Field of Classification Search
 None
 See application file for complete search history.

(56) References Cited

U.S. PATENT DOCUMENTS

| | | | |
|---|---|---|---|
| 6,490,778 B1 | 12/2002 | Funatsu et al. | |
| 2006/0280992 A1* | 12/2006 | Miyagawa | H01M 8/0226 429/520 |
| 2007/0212589 A1 | 9/2007 | Kobuchi et al. | |
| 2007/0298308 A1 | 12/2007 | Yamamoto et al. | |
| 2010/0239957 A1 | 9/2010 | Yamamoto et al. | |
| 2011/0123904 A1* | 5/2011 | Fujimura | H01M 8/026 429/512 |
| 2016/0064766 A1 | 3/2016 | Hashimoto et al. | |
| 2016/0129491 A1 | 5/2016 | Taguchi et al. | |

FOREIGN PATENT DOCUMENTS

| | | |
|---|---|---|
| EP | 1 667 262 A1 | 6/2006 |
| JP | 2003-297383 | 10/2003 |
| JP | 2003-303597 | 10/2003 |
| JP | 2005-293877 | 10/2005 |
| JP | 2005-322433 A | 11/2005 |
| JP | 2006-012712 | 1/2006 |
| JP | 2006-120497 A | 5/2006 |
| JP | 2006-228638 | 8/2006 |
| JP | 2008282728 A * | 11/2008 |
| JP | 2011-113806 A | 6/2011 |
| JP | 4975262 B | 7/2012 |
| JP | 2012-204118 | 10/2012 |
| JP | 2016-110724 | 6/2016 |

* cited by examiner

*Primary Examiner* — Daniel S Gatewood
(74) *Attorney, Agent, or Firm* — Finnegan, Henderson, Farabow, Garrett & Dunner, LLP

(57) ABSTRACT

A manufacturing method of a separator for a fuel cell, includes: setting a metal plate and first and second electro-conductive resin sheets between first and second dies; and forming a flow channel in the metal plate and the first and second electro-conductive resin sheets by hot pressing with the first and second dies.

8 Claims, 9 Drawing Sheets

MANUFACTURING METHOD OF SEPARATOR FOR FUEL CELL

CROSS-REFERENCE TO RELATED APPLICATION

This application is based upon and claims the benefit of priority of the prior Japanese Patent Application No. 2017-152032, filed on Aug. 4, 2017, the entire contents of which are incorporated herein by reference.

FIELD OF THE INVENTION

The present invention relates to a manufacturing method of a separator for a fuel cell.

BACKGROUND

There is known a fuel cell including a pair of separators sandwiching a membrane electrode gas diffusion layer assembly. Such a separator is formed with flow channels having a wavy shape in cross section. A reactant gas flows along the flow channels on the membrane electrode gas diffusion layer assembly side. A coolant flows on the side opposite to the flow channels. The membrane electrode gas diffusion layer assembly is sandwiched by the flow channels of the separators. In addition, there is known a separator including a metal plate and electro-conductive resin layers provided on respective surfaces of the metal plate. As for the flow channels, the metal plate and the electro-conductive resin layers are formed to have a wavy shape in cross section (see, for example, Japanese Unexamined Patent Application Publication No. 2003-297383).

As for such a manufacturing method of the separator, the metal plate having a plate shape and the electro-conductive resin layers each having a sheet shape are conceivably hot pressed by dies in a state where the metal plate is sandwiched therebetween. In this case, since the metal plate is hot pressed in a state of being sandwiched between the electro-conductive resin layers, the shape and the position of the metal plate may vary.

SUMMARY OF THE INVENTION

It is therefore an object of the present invention to provide a manufacturing method of a separator for a fuel cell in which variations in a shape and variations in a position of a metal plate are suppressed.

The above object is achieved by a manufacturing method of a separator for a fuel cell, including: setting a metal plate and first and second electro-conductive resin sheets between first and second dies such that the first electro-conductive resin sheet is set between the first die and the metal plate, that the second electro-conductive resin sheet is set between the second die and the metal plate, and that the metal plate having a plate shape is set between the first and second electro-conductive resin sheets, the first die including: a first convex surface and a first concave surface; and a first side surface connected between the first convex surface and the first concave surface, the second die including: a second concave surface and a second convex surface respectively facing the first convex surface and the first concave surface; and a second side surface facing the first side surface and connected between the second concave surface and the second convex surface; and forming a flow channel in the metal plate and the first and second electro-conductive resin sheets by hot pressing with the first and second dies, wherein a first protruding portion protruding from the first side surface is formed on the first side surface.

Since the first protruding portion is formed on the first side surface of the first die, in the hot pressing, a region of the metal plate between the first protruding portion of the first die and the second side surface of the second die is positionally defined. This can suppress variations in the shape and variations in the position of the metal plate.

When the first and second dies are closest to each other, at least one of a distance between the first convex surface and the second concave surface and a distance between the first concave surface and the second convex surface may be smaller than a distance between the first side surface and the side surface, and as compared with a protruding width of the first protruding portion from the first side surface, a length in a direction perpendicular to a direction in which the first convex surface and the first concave surface are arranged may be greater than the protruding width.

The first protruding portion may be closer to the first convex surface than the first concave surface.

When the first and second dies are closest to each other, a distance between the first side surface and the second side surface may be greater than a distance between the first concave surface and the second convex surface, and the first protruding portion may be closer to the first concave surface than the first convex surface.

The first protruding portion may be formed across the first side surface and the first concave surface.

A second protruding portion protruding from the second side surface may be formed on the second side surface.

DETAILED DESCRIPTION

Figure 1:
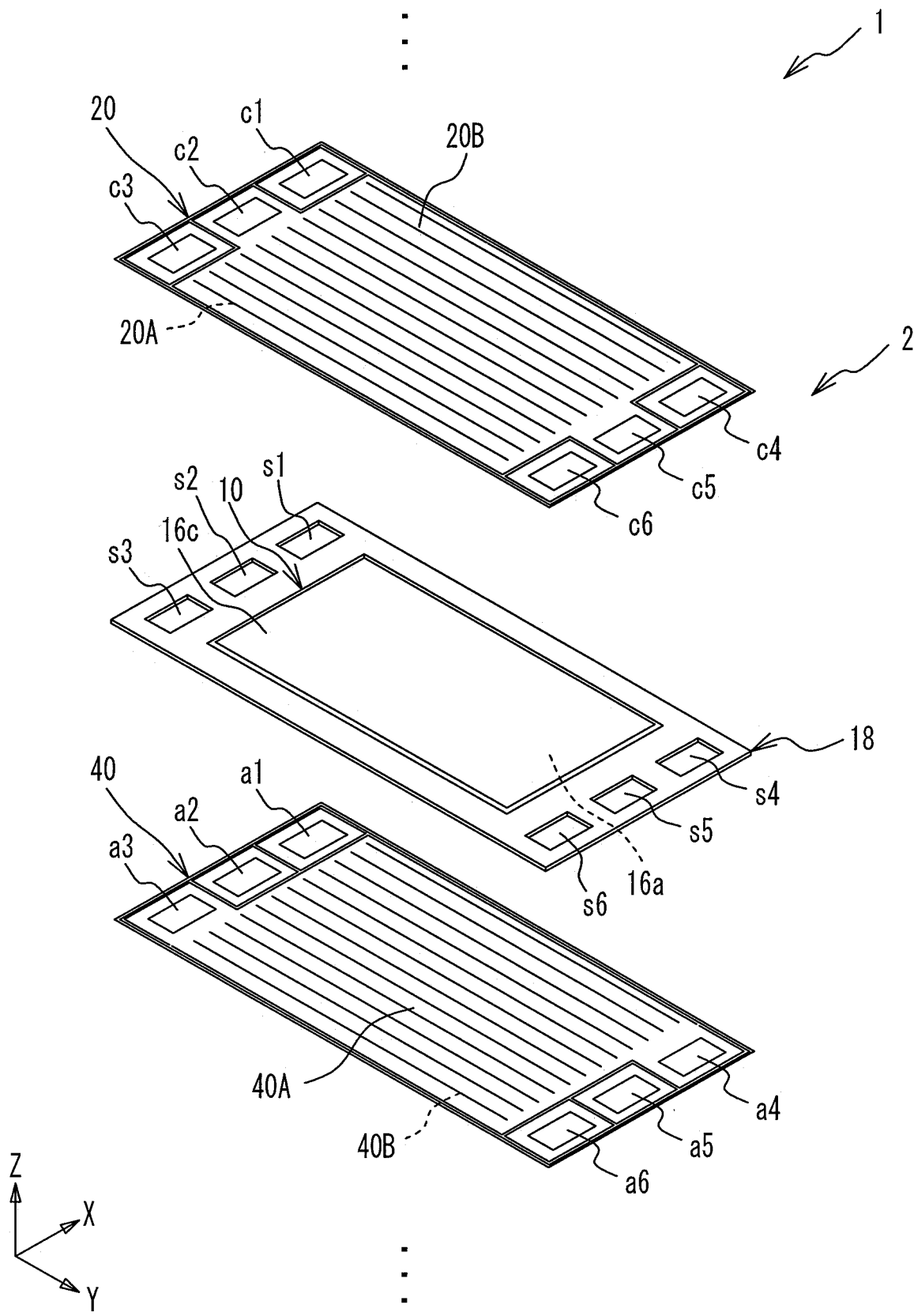
FIG. 1 is an exploded perspective view of a unit cell of a fuel cell.

FIG. 1 is an exploded perspective view of a unit cell 2 of a fuel cell 1. The fuel cell 1 is configured by stacking unit cells 2. FIG. 1 illustrates only one unit cell 2, and omits other unit cells. The unit cell 2 is stacked with other unit cells in the Z direction illustrated in FIG. 1. The unit cell 2 has a substantially rectangular shape. The longitudinal direction and the short direction of the unit cell 2 correspond to the Y direction and the X direction illustrated in FIG. 1, respectively.

The fuel cell 1 is a polymer electrolyte fuel cell that generates electric power with a fuel gas (for example, hydrogen) and an oxidant gas (for example, oxygen) as reactant gases. The unit cell 2 includes: a membrane electrode gas diffusion layer assembly 10 (hereinafter referred to as MEGA (Membrane Electrode Gas diffusion layer Assembly)); a support frame 18 supporting the MEGA 10; a cathode separator 20 and an anode separator 40 (hereinafter referred to as separators) sandwiching the MEGA 10. The MEGA 10 has a cathode gas diffusion layer 16c and an anode gas diffusion layer 16a (hereinafter referred to as diffusion layers). The support frame 18 has a substantially frame shape, and its inner peripheral side is joined to a peripheral region of the MEGA 10.

Holes c1 to c3 are formed along one of two short sides of the separator 20, and holes c4 to c6 are formed along the other side. Likewise, holes s1 to s3 are formed along one side of two short sides of the support frame 18, and holes s4 to s6 are formed along the other side. Likewise, holes a1 to a3 are formed along one side of two short sides of the separator 40, and holes a4 to a6 are formed along the other side. The holes c1, s1, and a1 communicate with one another to define a cathode inlet manifold. Likewise, the holes c2, s2, and a2 define a coolant inlet manifold. The holes c3, s3, and a3 define an anode outlet manifold. The holes c4, s4, and a4 define an anode inlet manifold. The holes c5, s5, and a5 define a coolant outlet manifold. The holes c6, s6, and a6 define a cathode outlet manifold. In the fuel cell 1 according to the present embodiment, liquid cooling water is used as a coolant.

A surface of the separator 40 facing the MEGA 10 is formed with anode flow channels 40A (hereinafter referred to as flow channels) which communicate the anode inlet manifold with the anode outlet manifold and along which the fuel gas flows. The surface of the separator 20 facing the MEGA 10 is formed with cathode flow channels 20A (hereinafter referred to as flow channels) which communicate the cathode inlet manifold with the cathode outlet manifold and along which the oxidant gas flows. The surface of the separator 40 opposite to the flow channels 40A and the surface of the separator 20 opposite to the flow channels 20A are respectively formed with coolant flow channels 20B and 40B (hereinafter referred to as flow channels) which communicate the coolant inlet manifold with the coolant outlet manifold and along which the coolant flows. The flow channels 20A and 20B extend in the longitudinal direction of the separator 20 (Y direction). Likewise, the flow channels 40A and 40B extend in the longitudinal direction of the separator 40 (Y direction).

Figure 2A:
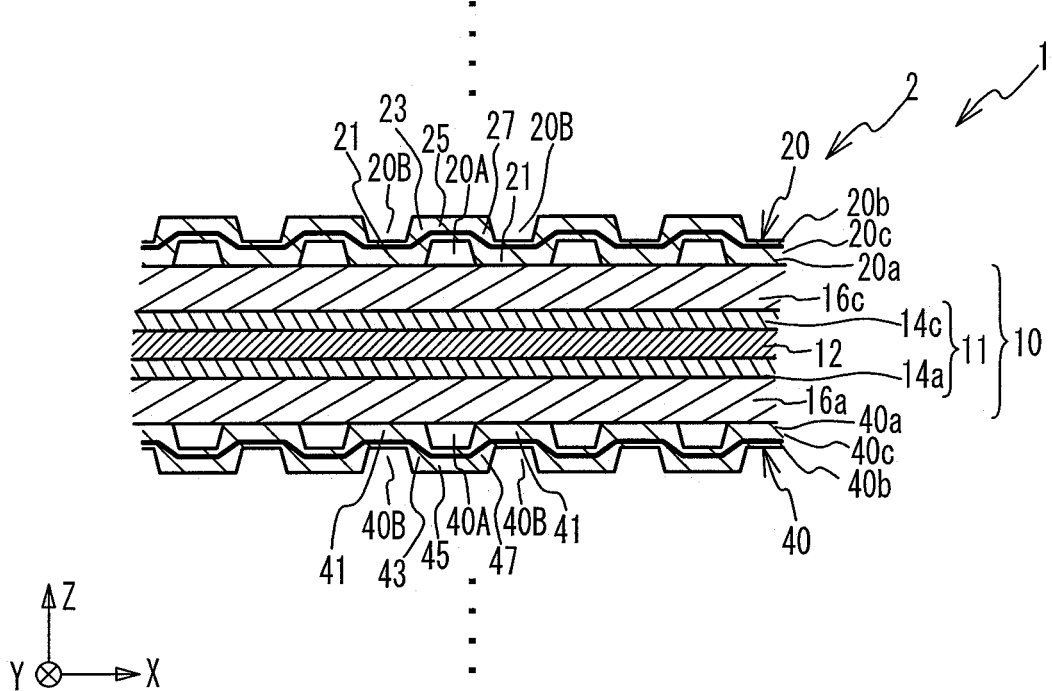
FIG. 2A is a partially cross-sectional view of the fuel cell where the unit cells are stacked.

FIG. 2A is a partially cross-sectional view of the fuel cell 1 where the unit cells 2 are stacked. FIG. 2A illustrates only one unit cell 2, and omits the other unit cells. FIG. 2A illustrates a cross section orthogonal to the Y direction.

The MEGA 10 includes the diffusion layers 16a and 16c, and a membrane electrode assembly (hereinafter referred to as MEA (Membrane Electrode Assembly)) 11. The MEA 11 includes an electrolyte membrane 12, and an anode catalyst layer 14a and a cathode catalyst layer 14c (hereinafter referred to as catalyst layers) formed on one surface and the other surface of the electrolyte membrane 12, respectively. The electrolyte membrane 12 is a solid polymer thin film, such as a fluorine-based ion exchange membrane, with high proton conductivity in a wet state. The catalyst layers 14a and 14c are made by coating a catalyst ink containing a carbon support carrying platinum (Pt) or the like and an ionomer having proton conductivity on the electrolyte membrane 12. The diffusion layers 16a and 16c are made of a material having gas permeability and conductivity, for example, a porous fiber base material such as carbon fiber or graphite fiber. The diffusion layers 16a and 16c are joined to the catalyst layers 14a and 14c, respectively.

The separator 20 includes: a metal plate 20c; an electro-conductive resin layer 20a (hereinafter, simply referred to as resin layer) formed on the diffusion layer 16c side of the metal plate 20c; and an electro-conductive resin layer 20b (hereinafter simply referred to as a resin layer) formed on the opposite side to the diffusion layer 16c of the metal plate 20c. A material of the metal plate 20c is not particularly limited, but can be stainless steel, titanium, aluminum, iron, copper, or the like. The resin layers 20a and 20b are made by dispersing conductive particles in a resin binder. The conductive particles can be appropriately selected from, for example, carbon, metal particles having conductivity such as stainless steel, titanium, and gold, and combination thereof. The resin binder can be appropriately selected from thermosetting resins such as epoxy and phenol, thermoplastic resins such as polypropylene, polyethylene, polyethylene naphthalate, and combination thereof. At least one of the resin layers 20a and 20b may further contain a hardening accelerator or a release agent such as fluorine. The metal plate 20c is covered with such resin layers 20a and 20b. This ensures the entire conductivity of the separator 20 and suppresses a decrease in corrosion resistance of the metal plate 20c. Also, the use of the metal plate 20c ensures airtightness between the oxidant gas flowing on one surface of the separator 20 and the coolant flowing on the other surface.

Likewise, the separator 40 includes: a metal plate 40c; an electro-conductive resin layer 40a (hereinafter, simply referred to as resin layer) formed on the diffusion layer 16a side of the metal plate 40c; and an electro-conductive resin layer 40b (hereinafter, simply referred to as a resin layer) formed on the opposite side to the diffusion layer 16a of the metal plate 40c. The separator 20 will be described below in detail. A detailed description of the separator 40 will be omitted, since the separator 40 is substantially the same as the separator 20.

The flow channels 20A, 20B, 40A, and 40B have a wavy shape in a cross-sectional view in the Y direction. Also, the resin layers 20a, 20b, 40a, and 40b and the metal plates 20c and 40c have a wavy shape in cross section. The flow channels 20A and 20B are defined by a convex portion 21, a side portion 23, a convex portion 25, a side portion 27, and a convex portion 21 . . . continuously repeated in the X direction, that is, in the direction in which the flow channels 20A and 20B are arranged. The convex portion 21 protrudes to the diffusion layer 16c so as to contact the diffusion layer 16c. The convex portion 25 does not contact the diffusion layer 16c and protrudes to the side opposite to the diffusion layer 16c. The side portion 23 is continuous and inclined between the convex portion 21 and the convex portion 25 away from the convex portion 21 in the +X direction. The side portion 27 is continuous and inclined between the convex portion 25 and the convex portion 21 away from the convex portion 25 in the +X direction.

A space surrounded by the side portion 23, the convex portion 25, and the side portion 27 is defined as the flow channel 20A of the separator 20 on the diffusion layer 16c side. Further, the convex portion 25 contact an anode separator of another unit cell not illustrated adjacent to the upper side of the unit cell 2 illustrated in FIG. 2A. On the anode separator side not illustrated, a space surrounded by the convex portion 21 and the side portions 23 and 27 is defined as the flow channel 20B of the separator 20. In this way, the flow channels 20A and 20B are integrally formed respectively on the side and the other side of the separator 20. The flow channels 20A and 20B are an example of flow channels formed by hot pressing the metal plate 20c and the resin layers 20a and 20b.

Likewise, the flow channels 40A and 40B are defined by a convex portion 41, a side portion 43, a convex portion 45, a side portion 47, and a convex portion 41 . . . continuously repeated in the X direction. The convex portion 41 protrudes to the diffusion layer 16a so as to contact the diffusion layer 16a. The convex portion 45 does not contact the diffusion layer 16a and protrudes to the side opposite to the diffusion layer 16a. The side portion 43 is continuous and inclined between the convex portion 41 and the convex portion 45 away from the convex portion 41 in the +X direction. The side portion 47 is continuous and inclined between the convex portion 45 and the convex portion 41 away from the convex portion 45 in the +X direction.

A space surrounded by the side portion 43, the convex portion 45, and the side portion 47 is defined as the flow channel 40A of the separator 40 on the diffusion layer 16a side. Further, the convex portion 45 contact a cathode separator of another unit cell not illustrated adjacent to the lower side of the unit cell 2 illustrated in FIG. 2. On the cathode separator side not illustrated, a space surrounded by the convex portion 41 and the side portions 43 and 47 is defined as the flow channel 40B of the separator 40. In this way, the flow channels 40A and 40B are integrally formed respectively on the side and the other side of the separator 40.

Figure 2B:
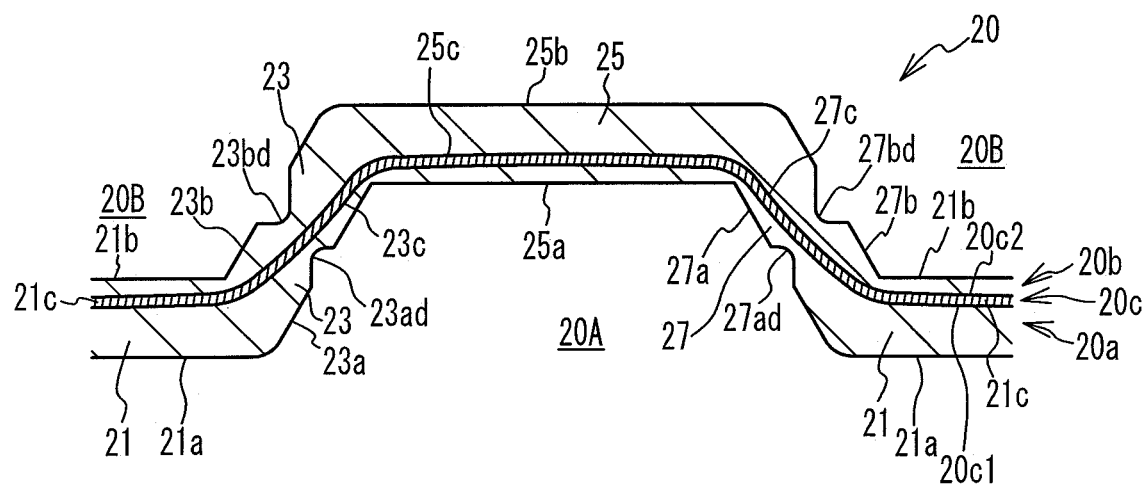
FIG. 2B is a partially enlarged sectional view of a separator.

FIG. 2B is a partially enlarged view of the separator 20. The metal plate 20c includes a surface 20c1 and a surface 20c2 opposite thereto. The surfaces 20c1 and 20c2 are respectively coated with the resin layers 20a and 20b. Additionally, the separator 20 is curved between the convex portion 21 and the side portion 23, between the side portion 23 and the convex portion 25, between the convex portion 25 and the side portion 27, and between the side portion 27 and the convex portion 21. The entire thickness of the separator 20 is substantially uniform at any position. The convex portions 21 and 25 are substantially parallel to the X direction and each has a substantially linear shape. The side portion 23 is inclined between the +X direction and the +Z direction from the convex portion 21 in the +X direction and has a substantially linear shape. The side portion 27 is inclined between the +X direction and the −Z direction from the convex portion 25 in the +X direction and has a substantially linear shape.

Herein, the convex portion 21 includes a convex surface 21a and a concave surface 21b. The convex portion 21a is the outer surface of the resin layer 20a, and the concave surface 21b is the outer surface of the resin layer 20b. The side portion 23 includes side surfaces 23a and 23b. The side surface 23a is the outer surface of the resin layer 20a, and the side surface 23b is the outer surface of the resin layer 20b. The convex portion 25 includes a concave surface 25a and a convex surface 25b. The concave surface 25a is the outer surface of the resin layer 20a, and the convex surface 25b is the outer surface of the resin layer 20b. The side portion 27 includes side surfaces 27a and 27b. The side surface 27a is the outer surface of the resin layer 20a, and the side surface 27b is the outer surface of the resin layer 20b. Regions of the metal plate 20c at the convex portion 21, at the side portion 23, at the convex portion 25, and at the side portion 27 are respectively defined as a convex region 21c, as a side region 23c, as a convex region 25c, and as a side region 27c.

The convex surfaces 21a and 25b and the concave surfaces 21b and 25a are substantially parallel to the X direction. The side surfaces 23a and 23b are substantially parallel to each other. The convex surfaces 21a and 25b are close to the surfaces 20c1 and 20c2 of the metal plate 20c, respectively. The side surfaces 27a and 27b are substantially parallel to each other. The side surfaces 23a and 23b and the side surfaces 27a and 27b are substantially symmetrical with respect to a plane that is perpendicular to the X axis and passes through the center of the convex portion 25. The convex surfaces 21a and 25b and the concave surfaces 21b and 25a are flat. However, the convex region 21c positioned between the convex surface 21a and the concave surface 21b is curved so as to slightly protrude in the −Z direction, in other words, to the surface 20c1. On the other hand, the convex region 25c positioned between the concave surface 25a and the convex surface 25b is curved so as, to slightly protrude in the +Z direction, in other words, to the surface 20c2. The side surfaces 23a, 23b, 27a, and 27b are also flat, but not limited thereto.

Recessed portions 23ad and 27ad are respectively formed in the side surfaces 23a and 27a of the resin layer 20a. Recessed portions 23bd and 27bd are respectively formed in the side surfaces 23b and 27b of the resin layer 20b. The recessed portions 23ad and 23bd are close to each other in the X direction. The recessed portions 27ad and 27bd are also similar. The side region 23c of the metal plate 20c is curved so as to pass between the recessed portions 23ad and 23bd and slightly away therefrom. Likewise, the side region 27c is curved so as to pass between the recessed portions 27ad and 27bd and slightly away therefrom. Herein, the separator 20 is formed by the hot pressing described above. In the hot pressing, a metal plate having a flat plate shape is pressed by dies, thereby forming the metal plate 20c illustrated in FIG. 2. The shapes and the positions of the side regions 23c and 27c of the metal plate 20c within the separator 20 are defined by the dies corresponding to the recessed portions 23ad, 23bd, 27ad, and 27bd. Details will be described later.

The convex surface 25b is flat as described above, thereby ensuring the contact area between the convex surface 25b of the separator 20 and the separator of the other unit cell adjacent to the separator 20. This suppresses an increase in electric resistance between the separator 20 and the separator of the other adjacent unit cell.

Likewise, the convex surface 21a is flat. This can ensure the contact area between the convex surface 21a of the separator 20 and the diffusion layer 16c. It is therefore possible to stably hold the MEGA 10 between the separators 20 and 40. This can hold the MEA 11 with sufficient sandwiching force. It is thus possible to suppress a decrease in strength of the MEA 11 due to repetition of swell, expansion, and contraction in a region thereof on which insufficient sandwiching force exerts.

Figure 3:
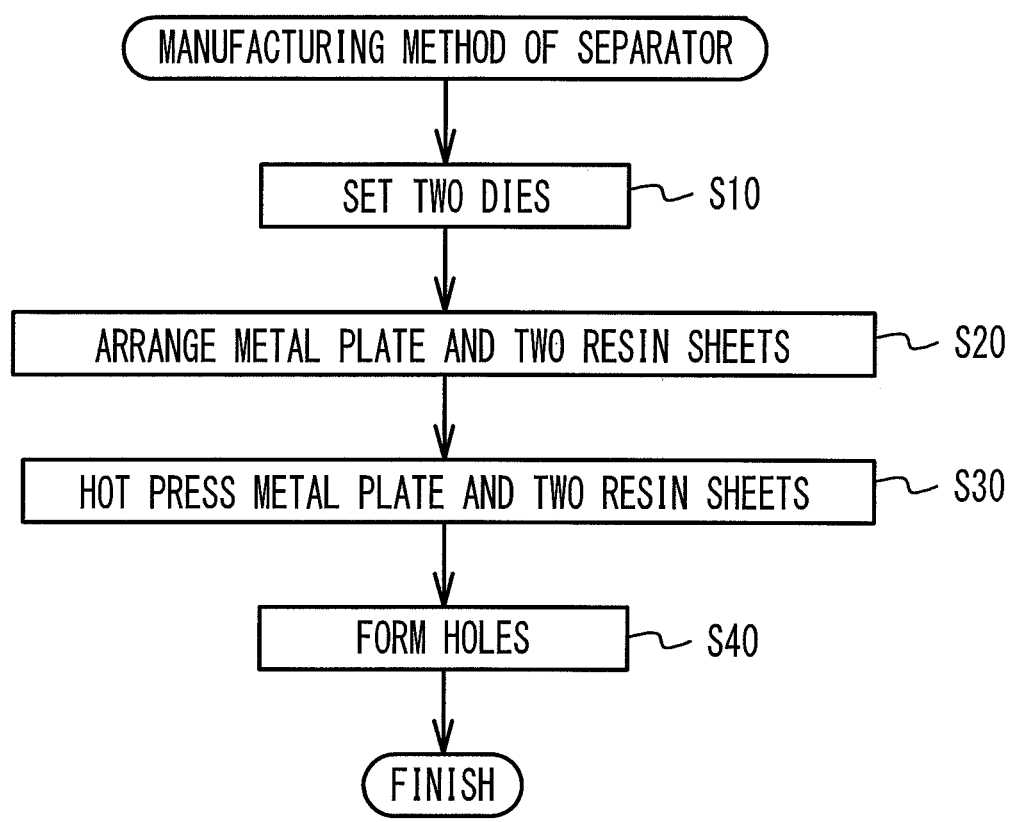
FIG. 3 is a flowchart illustrating a manufacturing method of the separator.
Figure 4A:
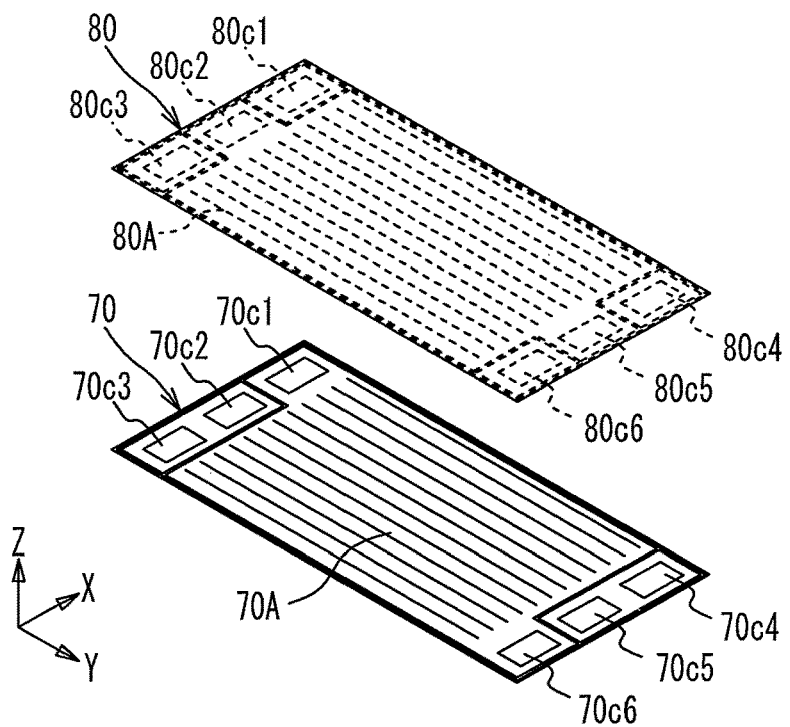
FIGS. 4A to 4C are explanatory views of dies used in manufacturing the separator.
Figure 4B:
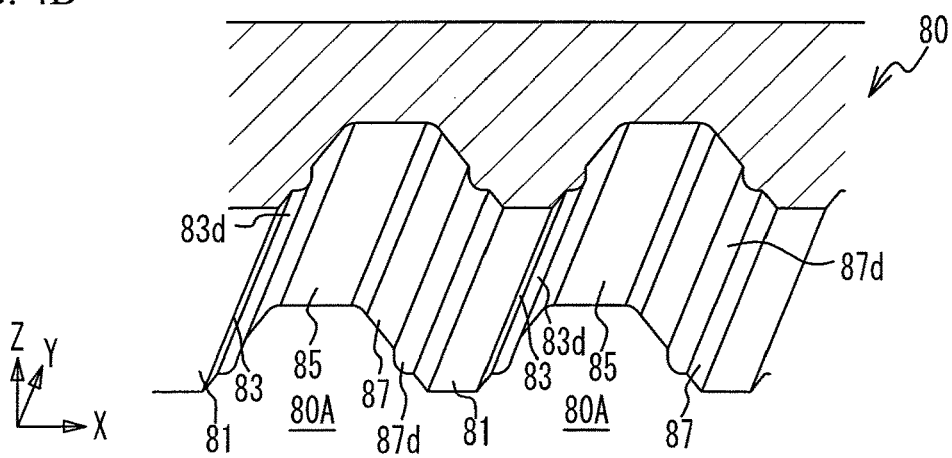
Figure 4C:
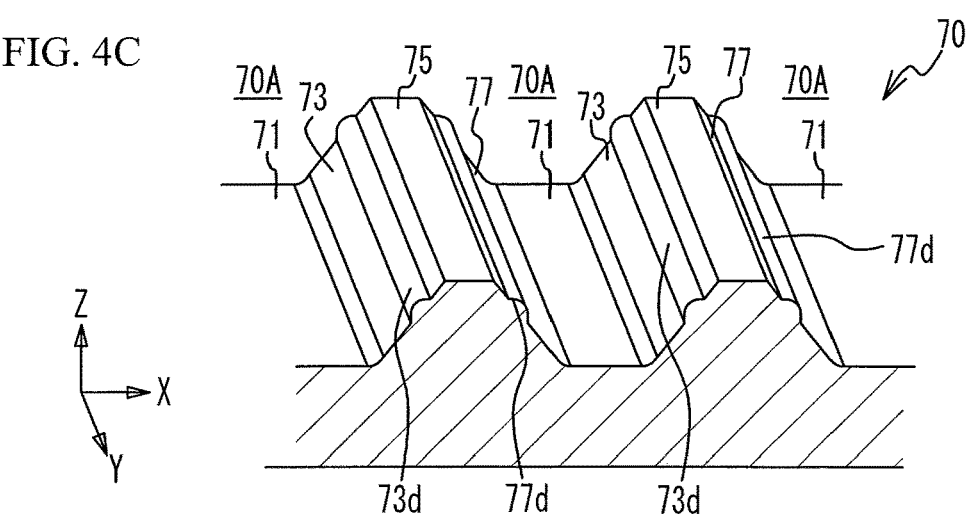
Figure 5A:
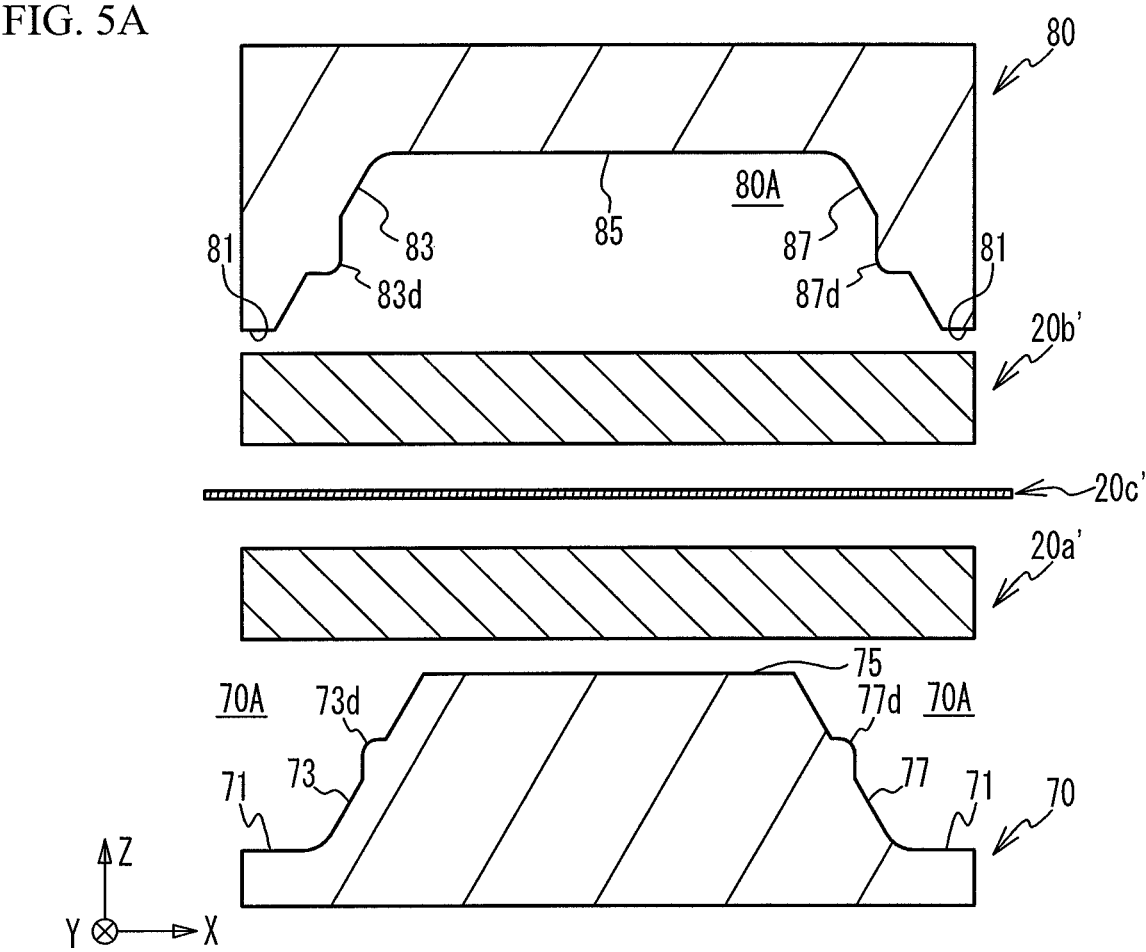
FIGS. 5A and 5B are explanatory views of the manufacturing method of the separator.
Figure 5B:
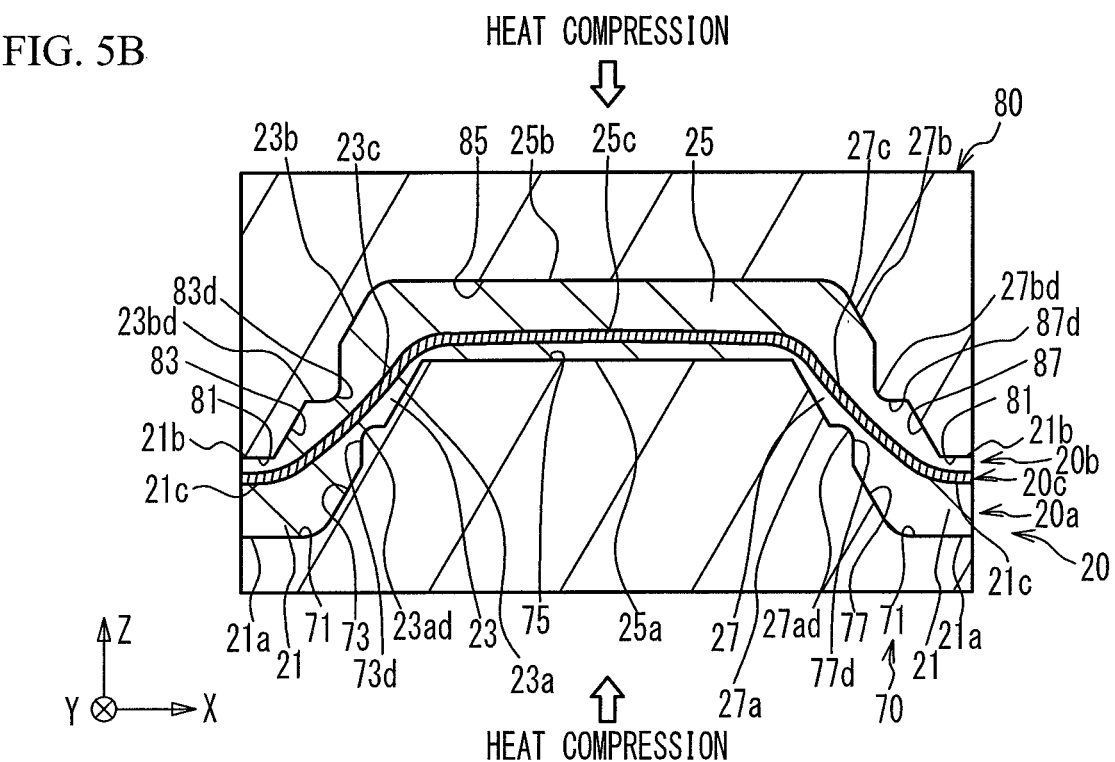

Next, a method of manufacturing the separator 20 will be described. FIG. 3 is a flowchart illustrating the method of manufacturing the separator 20. FIGS. 4A to 4C are explanatory views of dies 70 and 80 used in manufacturing the separator 20. FIG. 4A illustrates external views of the dies 70 and 80, and FIGS. 4B and 4C are partially enlarged views of the dies 80 and 70, respectively. FIGS. 5A and 5B are explanatory views of the method of manufacturing the separator 20. As described above, the separator 20 is manufactured by hot pressing. FIGS. 4B, 4C 5A, and 5B illustrate partially enlarged views of the dies in cross section. First, the dies 70 and 80 are set in a hot pressing device (step S10).

As illustrated in FIG. 4A, grooves 70A extending in the Y direction and having a wavy shape in the X direction are formed on the surface of the die 70 opposite to the die 80. Likewise, grooves 80A extending in the Y direction and having a wavy shape in the X direction are formed on the surface of the die 80 opposite to the die 70. Recessed portions 70c1 to 70c3 and recessed portions 70c4 to 70c6 are formed on the surface of the die 70 opposite to the die 80 so as to sandwich the grooves 70A in the Y direction. Recessed portions 80c1 to 80c3 and recessed portions 80c4 to 80c6 are formed on the surface of the die 80 opposite to the die 70 so as to sandwich the grooves 80A in the Y direction. The grooves 70A and 80A are portions for forming the flow channels 20A and 20B of the separator 20. The recessed portions 70c1 to 70c6 respectively face the recessed portions 80c1 to 80c6, and they are portions for forming the holes c1 to c6.

As illustrated in FIG. 4B, the groove 80A is defined by a convex surface 81, a side surface 83, a concave surface 85, a side surface 87, a convex surface 81 . . . formed in this order in the X direction. The concave surface 85 recedes from the die 70 with respect to the convex surface 81, and the convex surface 81 protrudes to the die 70 from the concave surface 85. The convex surface 81 and the concave surface 85 are substantially parallel to the X direction and are formed into be flat. The side surface 83 is inclined and positioned between the convex surface 81 and the concave surface 85 positioned in the +X direction from the convex surface 81, and connects the both surfaces. The side surface 87 is inclined and positioned between the concave surface 85 and the convex surface 81 positioned in the +X direction from the concave surface 85, and connects both surfaces. The side surfaces 83 and 87 are respectively provided with protruding portions 83d and 87d that partially protrude respectively from the side surfaces 83 and 87 to the die 70 and are formed continuously in the Y direction, that is, in a direction in which the groove 80A extends. The protruding portions 83d and 87d are respectively formed over the entire side surfaces 83 and 87 in the Y direction in which the groove 80A extends.

The protruding portions 83d and 87d are respectively provided substantially at the centers of the side surfaces 83 and 87 in the X direction, but are not particularly limited thereto. The protruding height and the protruding width of the protruding portion 83d from the side surface 83 are constant in the Y direction, but are not particularly limited thereto. The protruding height and the protruding width of the protruding portion 87d from the side surface 87 are also similar. Although each shape of the outer surface of the protruding portions 83d and 87d is a smoothly curved shape in a cross-sectional view perpendicular to the Y direction, but not particularly limited thereto. The protruding portions 83d and 87d correspond to the recessed portions 23bd and 27bd illustrated in FIG. 2B, respectively.

As illustrated in FIG. 4C, the groove 70A is defined by a concave surface 71, a side surface 73, a convex surface 75, a side surface 77, a concave surface 71 . . . formed in this order in the X direction. The convex surface 75 protrudes to the die 80 with respect to the concave surface 71, and the concave surface 71 recedes from the die 80 with respect to the convex surface 75. The concave surface 71 and the convex surface 75 are substantially parallel to the X direction and are flat. The side surface 73 is inclined between the concave surface 71 and the convex surface 75 positioned in the +X direction from the concave surface 71, and connects both surfaces. The side surface 77 is positioned between the convex surface 75 and the concave surface 71 positioned in the +X direction from the convex surface 75, and connects both surfaces. The side surfaces 73 and 77 are respectively provided with protruding portions 73d and 77d that partially protrude respectively from the side surfaces 73 and 77 to the die 80 and are continuous in the Y direction, that is, in the direction in which the groove 70A extends. The protruding portions 73d and 77d are formed over the entire side surfaces 73 and 77, respectively, in the Y direction in which the groove 70A extends.

The protruding portions 73d and 77d are respectively provided substantially at the centers of the side surfaces 73 and 77 in the X direction, but are not particularly limited thereto. The protruding height and the protruding width of the protruding portion 73d from the side surface 73 are constant in the Y direction, but are not particularly limited thereto. The protruding height and the protruding width of the protruding portion 77d from the side surface 77 are also similar. Each shape of the outer surface of the protruding portions 73d and 77d is a smoothly curved shape in a cross-sectional view perpendicular to the Y direction, but is not particularly limited thereto. The protruding portions 73d and 77d correspond to the recessed portions 23ad and 27ad illustrated in FIG. 2B, respectively.

The concave surface 71, the side surface 73, the convex surface 75, and the side surface 77 are respectively complementary to the convex surface 81, the side surface 83, the concave surface 85, and the side surface 87, except for the protruding portions 73d, 77d, 83d, and 87d. The dies 70 and 80 are beforehand set such that the concave surface 71, the side surface 73, the protruding portion 73d, the convex surface 75, the side surface 77, and the protruding portion 77d respectively face the convex surface 81, the side surface 83, the protruding portion 83d, the concave surface 85, the side surface 87, and the protruding portion 87d. Thus the protruding portions 73d and 83d are close to each other in the X direction, and the protruding portions 77d and 87d are also similar.

Each angle of the above-described surfaces is set to correspond to each outer surface of the above-described separator 20 as follows. Specifically, each of an exterior angle of the die 70 between the concave surface 71 and the side surface 73, an exterior angle of the die 70 between the side surface 77 and the concave surface 71, an exterior angle of the die 80 between the side surface 83 and the concave surface 85, and an exterior angle of the die 80 between the concave surface 85 and the side surface 87 are set to be 90 degrees or more but less than 180 degrees. Each of an exterior angle of the die 70 between the side surface 73 and the convex surface 75, an exterior angle of the die 70 between the convex surface 75 and the side surface 77, exterior angle of the die 80 between the convex surface 81 and the side surface 83, an exterior angle of the die 80 between the side face 87 and the convex face 81 is set to be greater than 180 degrees but not more than 270 degrees.

Next, as illustrated in FIG. 5A, an electro-conductive resin sheet (hereinafter referred to as a resin sheet) 20a' is set between the die 70 and the metal plate 20c', the resin sheet 20b' is set between the die 80 and the metal plate 20c', and the metal plate 20c' having a flat shape is set between the resin sheets 20a' and 20b' (step S20). The metal plate 20c' corresponds to the metal plate 20c of the completed separator 20. The resin sheets 20a' and 20b' respectively correspond to the resin layers 20a and 20b of the completed separator 20. As an example, when a thermosetting resin is used as the resin binder, the resin sheets 20a' and 20b' are heated to a temperature lower than the curing temperature of the thermosetting resin to be brought into a semi-cured state and to each have a sheet shape. Next, the resin sheets 20a' and 20b' and the metal plate 20c' are heated and pressed by the dies 70 and 80 as illustrated in FIG. 5B (step S30).

When the hot pressing starts in the state where the resin sheets 20a' and 20b' and the metal plate 20c' are laminated, the convex surface 75 presses the resin sheet 20a' to the die 80, and the convex surface 81 presses the resin sheet 20b' to the die 70. Then, the resin sheets 20a' and 20b' and the metal plate 20c' are integrally curved along the shapes of the dies 70 and 80. Herein, the resin sheets 20a' and 20b' in the semi-cured state described above are softer than the metal plate 20c'. Thus, the resin sheets 20a' and 20b' are respectively deformed along the shapes of the dies 70 and 80, and the deformation amount of the metal plate 20c' is smaller than that of the resin sheets 20a' and 20b'.

When the dies 70 and 80 further come close to each other, the metal plate 20c' is partially sandwiched by the protruding portions 73d and 83d through the resin sheets 20a' and 20b'. Likewise, the metal plate 20c' is partially sandwiched by the protruding portions 77d and 87d. This is because each of a gap between the protruding portion 73d and the protruding portion 83d and a gap between the protruding portion 77d and the protruding portion 87d is smaller than a gap between other portions such as a gap between the convex surface 75 and the concave surface 85. Therefore, the metal plate 20c' between the dies 70 and 80 is positionally defined by the protruding portion 73d and the protruding portion 83d, and by the protruding portions 77d and 87d. This suppresses variations in the shape of the metal plate 20c' and suppresses variations in the position thereof in the hot pressing. Thus, the side regions 23c and 27c are positionally defined by the protruding portions 73d, 83d, 77d, and 87d as illustrated in FIG. 5B, thereby forming the metal plate 20c into the shape illustrated in FIG. 2B. In particular, as compared with the convex regions 21c and 25c, the side regions 23c and 27c of the metal plate 20c are formed by greatly bending the metal plate 20c' having an originally flat-plate-shape. Such a large deformable region of the metal plate 20c' is positionally defined in the hot pressing, thereby effectively suppressing variations in the position and variations in the shape of the entire metal plate 20c. Further, as illustrated in FIG. 5B, the resin sheets 20a' and 20b' are deformed and compressed to form the resin layers 20a and 20b the same as the shape illustrated in FIG. 2B. For example, in a case without respectively providing the protruding portions 73d and 83d in the dies 70 and 80, the side region 23c of the metal plate 20c might be too close to the side surface 23a. As a result, an increase in curvature of a region between the side region 23c and the convex region 25c might decrease the stiffness. Moreover, the side region 23c is too close to the side surface 23b, so that an increase in curvature of the region between the convex region 21c and the side region 23c might decrease the stiffness. The present embodiment suppresses such a problem. Further, since variations in the position of the metal plate 20c within the separator 20 is suppressed, thereby suppressing variations in performance of the separator 20, such as conductivity and stiffness.

The protruding portions 73d and 83d define the position of the side region 23c of the completed metal plate 20c as described above, and the side region 23c is adjacent to the convex regions 21c and 25c. Therefore, the position of the side region 23c is defined, so that the positions of the convex regions 21c and 25c adjacent to the side region 23c are also defined to some extent. Likewise, the protruding portions 77d and 87d define the position of the side region 27c adjacent to the convex regions 25c and 21c, so the convex regions 25c and 21c adjacent to the side region 27c can be positionally defined by defining the position of the side region 27c. By positionally defining the side regions 23c and 27c in this manner, any region of the metal plate 20c can be positionally defined, thereby effectively suppressing variations in any region of the metal plate 20c.

As illustrated in FIG. 5B, the protruding portions 83d and 87d sandwich the resin layer 20b of the convex portion 25 in the X direction. This suppresses the amount of the resin sheet 20b' partially flowing from a gap between the concave surface 85 and the metal plate 20c' to a gap between the convex surface 81 and the metal plate 20c' in the hot pressing. In particular, the protruding portions 83d and 87d are continuously formed in the Y direction as illustrated in FIG. 4B, thereby further suppressing the resin sheet 20b' from partially flowing. This ensures the density of the conductive particles in the resin layer 20b of the convex portion 25, thereby ensuring the conductivity between the convex surface 25b and a separator of another unit cell contacting therewith.

In consideration of the viscosity of the resin sheets 20a' and 20b' in the hot pressing, the heating temperature of the resin sheets 20a' and 20b' is adjusted so as to each have a desired shape before the resin sheets 20a' and 20b' are completely thermally cured. In the hot pressing, the resin sheet 20a' is compressed between the die 70 and the metal plate 20c'. Additionally, after the hot pressing, the resin layers 20a and 20b and the metal plate 20c are cooled and integrated. Further, the deformation amount of the metal plate 20c' can be adjusted by changing each viscosity of the resin sheets 20a' and 20b'. The relatively low viscosity of the resin sheets 20a' and 20b' causes a small deformation amount of the metal plate 20c'. The relatively high viscosity of the resin sheets 20a' and 20b' causes a large deformation amount of the metal plate 20c'.

After the flow channels 20A and 20B are formed, holes are formed at positions corresponding to the recessed portions 70c1 to 70c6 and 80c1 to 80c6 of the integrated resin layers 20a and 20b and the metal plate 20c so as to form the holes c1 to c6 illustrated in FIG. 1 (Step S40). In such a manner, the separator 20 is manufactured. The separator 40 is also manufactured by the same method.

As described above, the flow channels 20A and 20B can be formed by hot pressing the resin sheets 20a' and 20b' and the flat plate-shaped metal plate 20c' once. Thus, the manufacturing method is simplified. In order to improve the joining force between the resin sheets 20a' and 20b' and the metal plate 20c', undercoat paint may be applied beforehand on both surfaces of the metal plate 20c' before the hot pressing. This can ensure the stiffness of the completed separator 20. In addition, the surface portions of the resin sheets 20a' and 20b' may be previously joined to the metal plate 20c' before the hot pressing. This facilitates handling the metal plate 20c' and the resin sheets 20a' and 20b' in the hot pressing.

The concave surfaces 71 and 85 are flat, so that the convex surfaces 21a and 25b of the separator 20 are also flat. This can ensure the contact area between the separator 20 and the separator of another unit cell adjacent to the separator 20, and ensure the contact area between the separator 20 and the diffusion layer 16c, as described above.

In the above embodiment, the protruding portion 73d is positioned at the center of the side surface 73 in the X direction, but is not limited thereto. The size of the protruding portion 73d is also not particularly limited. However, the protruding height of the protruding portion 73d in the direction perpendicular to the side surface 73 is needed such that the protruding portion 73d does not come into contact with the metal plate 20c when the dies 70 and 80 are closest to each other. Further, each protruding height of the protruding portions 73d and 83d is needed such that the gap between the protruding portions 73d and 83d is larger than the thickness of the metal plate 20c when the dies 70 and 80 are closest to each other. The same applies to the protruding portions 77d and 87d. The shape of the protruding portion 73d is not limited to the above-described one, and may be a polygonal shape such as a triangle shape in a cross-sectional view perpendicular to the Y direction. Likewise, the positions, the sizes, and the shapes of the protruding portions 77d, 83d, and 87d are not limited to the above examples. Further, the protruding portions 73d and 83d in the X direction may be close to or distant from each other. The same applies to the protruding portions 77d and 87d. Furthermore, such a protruding portion may be provided only in one of the dies 70 and 80. The die 70 may be provided with only one of the protruding portions 73d and 77d. Likewise, the die 80 may be provided with only one of the protruding portions 83d and 87d. Moreover, at least one of the side surfaces 73, 77, 83, and 87 may be provided with plural protruding portions distant from each other in the X direction.

The above manufacturing method has described the thermosetting resin as an example of the resin binders of the resin sheets 20a' and 20b'. In the case of the thermoplastic resin as the resin binder, the resin sheet is heated to a certain temperature to be brought into a semi-cured state before the hot press, and the resin sheet is pressed and heated to a temperature at which the viscosity does not decrease too much, and then the resin sheet may be cooled.

Figure 6A:
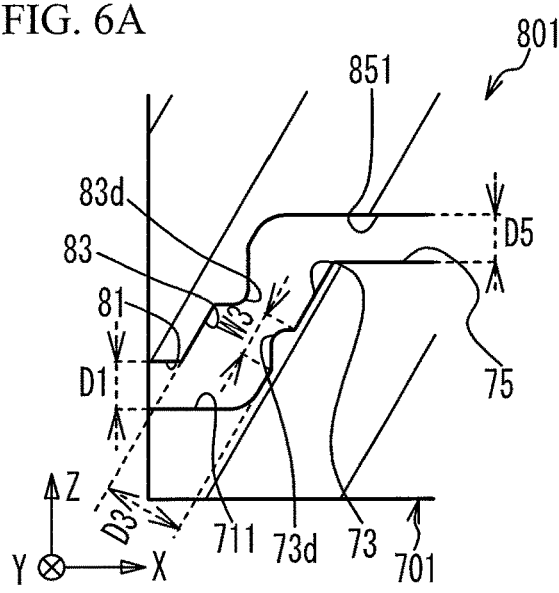
FIG. 6A is a partially cross-sectional view of dies according to the first variation.

Next, variations of dies will be described. The same components are represented with the same reference numerals, and the duplicated description is omitted. FIG. 6A is a partially cross-sectional view of dies 701 and 801 according to the first variation, and is an enlarged view partially corresponding to FIG. 5B. FIG. 6A partially illustrates the dies 701 and 801 that are closest to each other in a state where desired flow channels are formed in the separator. As for the dies 701 and 801, a distance D1 between a concave surface 711 and a convex surface 81 and a distance D5 between the convex surface 75 and a concave surface 851 are each smaller than a distance D3 between the side surfaces 73 and 83. The distance D1 and the distance D5 are, but not limited to, each set to be, for example, 0.8 times or less of the distance D3. Therefore, in the hot pressing, each compression amount of the resin sheets 20a' and 20b' is larger between the concave surface 711 and the convex surface 81 and between the convex surface 75 and the concave surface 851 than between the side surfaces 73 and 83. This makes the density of the conductive particles within the resin sheets 20a' and 20b' higher between the concave surface 711 and the convex surface 81 and between the convex surface 75 and the concave surface 851 than between the side surfaces 73 and 83. Regarding the separator 20 manufactured in this manner, the density of the conductive particles is higher in the convex portions 21 and 25 than in the side portions 23 and 27, thereby improving the conductivity in the convex portions 21 and 25. It is thus possible to ensure the conductivity between the convex portion 21 and the diffusion layer 16c contacting therewith and to ensure the conductivity between the convex portion 25 and a separator of another cell contacting therewith.

FIG. 6A also illustrates a protruding width W3 indicating a width, in a direction parallel to the side surface 73, of the protruding portion 73d protruding therefrom. In this variation, the protruding portion 73d is also formed to extend in the Y direction over the entire side surface 73. In other words, the length of the protruding portion 73d in the direction perpendicular to the direction in which the convex surface 75 and the concave surface 711 are arranged is greater than the projecting width W3 from the side surface 73. Likewise, the length of the protruding portion 83d in the direction perpendicular to the direction in which the convex surface 81 and the concave surface 851 are arranged is greater than a projecting width of the protruding portion 83d from the side surface 83. Herein, in the hot pressing, the resin sheets 20a' and 20b' compressed between the convex surface 75 and the concave surface 851 through the metal plate 20c' might partially flow to the gap between the side surfaces 73 and 83, because the distance D3 is greater than the distance D5. Likewise, the resin sheets 20a' and 20b' compressed between the concave surface 711 and the convex surface 81 through the metal plate 20c' might partially flow to the gap between the side surfaces 73 and 83, because the distance D3 is greater than the distance D1. Since each of the protruding portions 73d and 83d has a length greater than the projecting width in this variation as described above, the flow described above can be effectively suppressed. Thus, a separator with improved conductivity can be manufactured.

In the first variation, at least one of the distances D1 and D5 may be smaller than the distance D3. It is therefore possible to ensure the conductivity of at least one of the convex portions 21 and 25 of the separator 20. In the first variation, each of the distances D1 and D5 may be smaller than the distance between the side surface 77 and the side surface 87, but is not limited thereto. That is, at least one of the distances D1 and D5 may be smaller than at least one of the distance D3 and the distance between the side surface 77 and the side surface 87. Each of the distances D1 and D5 is a distance in the direction perpendicular to the concave surface 711, the convex surface 81, the convex surface 75, and the concave surface 851. The distance D3 is a distance, in the direction perpendicular to the side surfaces 73 and 83, of a region where the protruding portions 73d and 83d are not formed. The distance between the side surface 77 and the side surface 87 is a distance, in the direction perpendicular to the side surfaces 77 and 87, of a region where the protruding portions 77d and 87d are not formed. At least one of the protruding portions 73d, 83d, 77d, and 87d may have a length in the direction perpendicular to the direction in which the convex surface 75 and the concave surface 711 are arranged is greater than the protruding width.

Figure 6B:
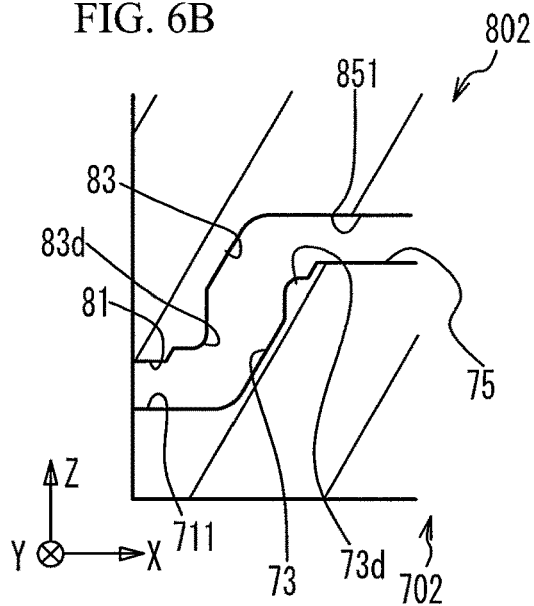
FIG. 6B is a partially cross-sectional view of dies according to the second variation.

FIG. 6B is a partially cross-sectional view of dies 702 and 802 according to the second variation. The difference from the first variation is that the protruding portion 73d is closer to the convex surface 75 than the concave surface 711, and that the protruding portion 83d is closer to the convex surface 81 than the concave surface 851. Herein, for example, if the protruding portions 73d and 83d are not provided, the side region 23c of the metal plate 20c, particularly in the vicinity of the convex portion 25, might be too close to the side surface 23a. In this variation, since the protruding portion 73d is formed at the above-described position, it is possible to suppress the side region 23c of the metal plate 20c in the vicinity of the convex portion 25 from being too close to the side surface 23a. Likewise, since the protruding portion 83d is formed at the above-described position, it is possible to suppress the side region 23c of the metal plate 20c in the vicinity of the convex portion 21 from being too close to the side surface 23b. Also, in the second variation, the protruding portion 77d may be formed at a position closer to the convex surface 75 than the concave surface 711, and the protruding portion 87d may be formed at a position closer to the convex surface 81 than the concave surface 851, but they are not limited. That is, at least one of the protruding portions 73d, 77d, 83d, and 87d may be formed at a position closer to the convex surface adjacent thereto than the concave surface. Additionally, the configuration of this variation may apply to the above-described embodiment. In FIG. 6B, the distance D1 between the concave surface 711 and the convex surface 81 and the distance D5 between the convex surface 75 and the concave surface 851 are each smaller than the distance D3 between the side surfaces 73 and 83, but not limited thereto. For example, each of the distance D1 between the concave surface 711 and the convex surface 81 and the distance D5 between the convex surface 75 and the concave surface 851 may be substantially the same as the distance D3 between the side surfaces 73 and 83.

Figure 6C:
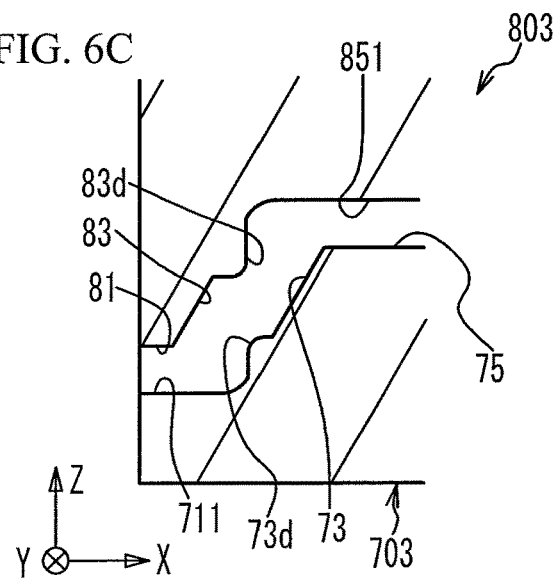
FIG. 6C is a partially cross-sectional view of dies according to the third variation.

FIG. 6C is a partially cross-sectional view of dies 703 and 803 according to the third variation. The difference from the first variation is that the protruding portion 73d is formed at a position closer to the concave surface 711 than the convex surface 75 and that the protruding portion 83d is formed at a position closer to the concave surface 851 than the convex surface 81. As described in the first variation, in the hot pressing, the protruding portion 83d formed at such a position can suppress the resin sheet 20b' compressed between the concave surface 851 and the metal plate 20c' from partially flowing to the gap between the side surface 83 and the metal plate 20c'. It is also possible to suppress the resin sheet 20a' compressed between the concave surface 711 and the metal plate 20c' from partially flowing to the gap between the side surface 73 and the metal plate 20c' in the hot pressing. This ensures the conductivity in the convex portions 21 and 25. Also, in the third variation, the protruding portion 77d may be also formed at a position closer to the concave surface 711 than the convex surface 75, and the protruding portion 87d may be also formed at a position closer to the concave surface 851 than the convex surface 81, but they are not limited thereto. That is, at least one of the protruding portions 73d, 77d, 83d, and 87d is formed at a position closer to the concave surface adjacent thereto than the convex surface. In FIG. 6C, the distance D3 between the side surfaces 73 and 83 is larger than each of the distance D1 between the concave surface 711 and the convex surface 81 and the distance D5 between the convex surface 75 and the concave surface 851, but it is not limited to this. The distance D3 between the side surfaces 73 and 83 may be smaller than the distance D1 between the concave surface 711 and the convex surface 81, and the protruding portion 73d may be arranged closer to the concave surface 711 than the convex surface 75. The distance D3 between the side surface 73 and the side surface 83 may be smaller than the distance D5 between the convex surface 75 and the concave surface 851, and the protruding portion 83d may be arranged closer to the concave surface 851 than the convex surface 81.

Figure 6D:
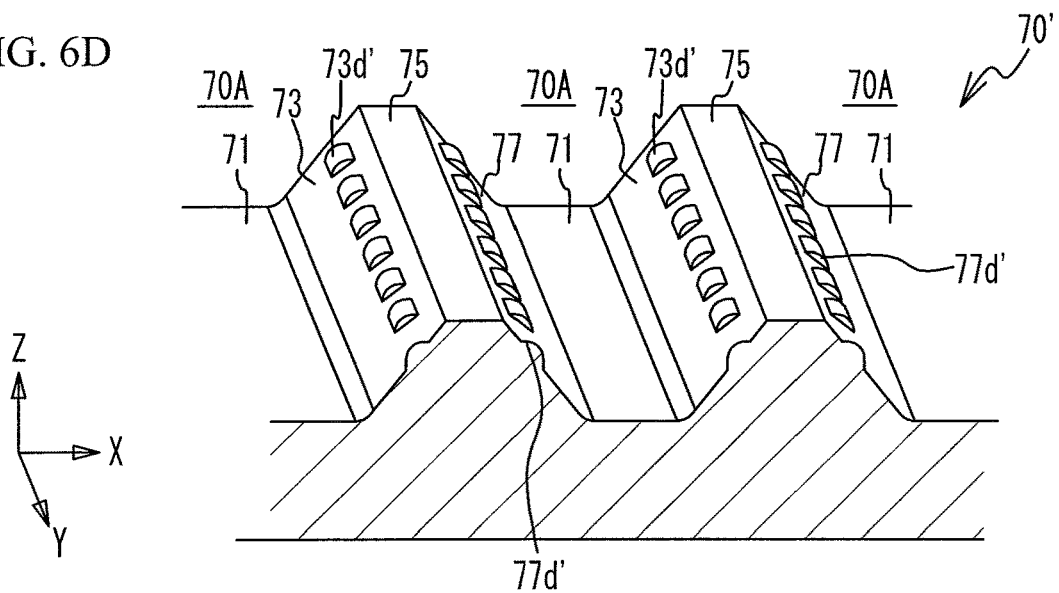
FIG. 6D is a partially enlarged view of dies according to the fourth variation.

FIG. 6D is a partially cross-sectional perspective view of a die 70' according to the fourth variation. Protruding portions 73d' and 77d' of the die 70 'are each provided at predetermined intervals in the Y direction. The protruding portions 73d' and 77d' have the same shapes as the protruding portions 73d and 77d described above in cross-sectional view, and each has a curved shape. Such dies 70 'and 80 can suppress variations in the shape and variations in the position of the metal plate 20c. Instead of the die 80, a die like the die 70' provided with plural protruding portions 73d' and 77d' may be used.

The shape of the protruding portion 73d' is not particularly limited, and may be, for example, a conical shape, a pyramidal shape, a cylindrical shape, a prismatic shape, or the like. It is preferable that the interval between the protruding portions 73d' in the Y direction is set so as to suppress variations in the shape and variations in the position of the metal plate 20c in the hot pressing. The number and the size of the protruding portions 73d' are not particularly limited. The same applies to the protruding portion 77d'. The shape, the number, and the size of each of the protruding portions 73d' and 77d' may be appropriately set in consideration of, for example, the viscosity of the resin sheets 20a' and 20b' before curing, the stiffness and the thickness of the metal plate 20c', and the like. In addition, instead of the protruding portion 73d in the first to third variations, the protruding portion 73d' in the fourth variation may be adopted.

Figure 7:
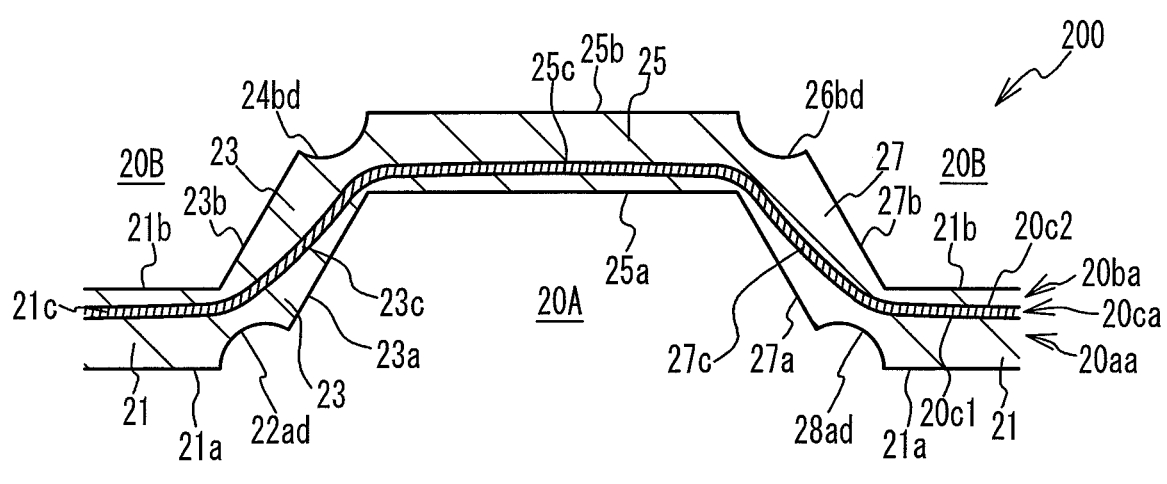
FIG. 7 is a partially enlarged cross-sectional view of a separator manufactured by dies according to the fifth variation.
Figure 7:
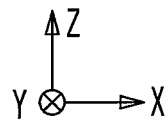

Next, a description will be given of a separator 200 manufactured by dies 70a and 80a according to the fifth variation, before the dies 70a and 80a will be described. FIG. 7 is a partially enlarged cross-sectional view of the separator 200 manufactured by the dies 70a and 80a according to the fifth variation. The separator 200 includes resin layers 20aa and 20ba and a metal plate 20ca. The resin layer 20aa is provided with depressed portions 22ad and 28ad. The resin layer 20ba is provided with depressed portions 24bd and 26bd. The recessed portion 22ad is formed across a boundary portion between the convex surface 21a and the side surface 23a adjacent to each other. The recessed portion 24bd is formed across a boundary portion between the side surface 23b and the convex surface 25b adjacent to each other. The recessed portion 26bd is formed across a boundary portion between the convex surface 25b and the side surface 27b adjacent to each other. The depressed portion 28ad is formed across a boundary portion between the side surface 27a and the convex surface 21a adjacent to each other. Therefore, the recessed portions 22ad and 24bd are distant away from each other in the X direction, as compared with the recessed portions 23bd and 23ad in the above embodiment. The same applies to the recessed portions 26bd and 28ad. The depressed portions 22ad, 24bd, 26bd, and 28ad each has a shape smoothly curved in a cross-sectional view perpendicular to the Y direction.

Figure 8A:
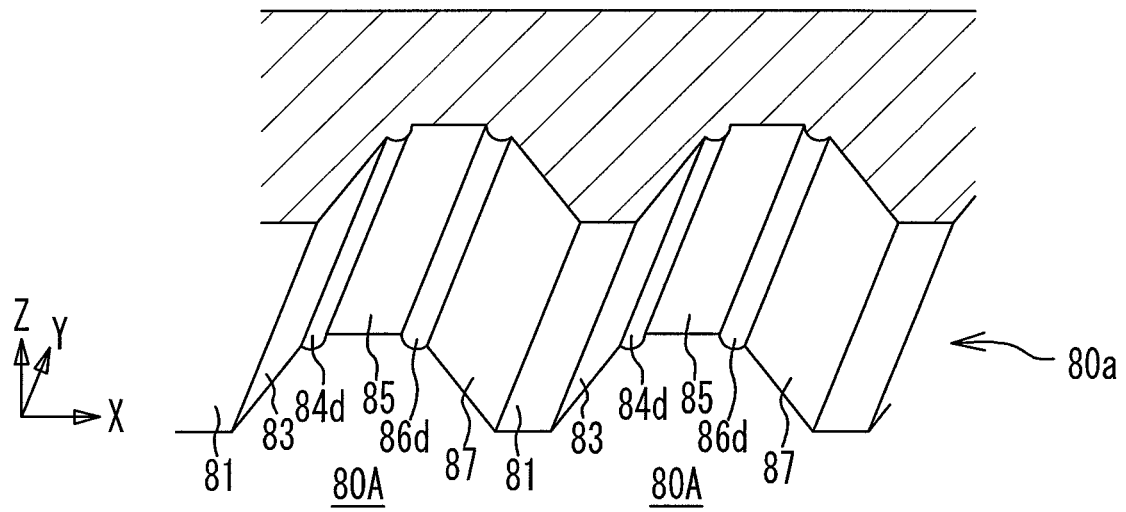
FIGS. 8A and 8B are partially enlarged view of the dies according to the fifth variation.
Figure 8B:
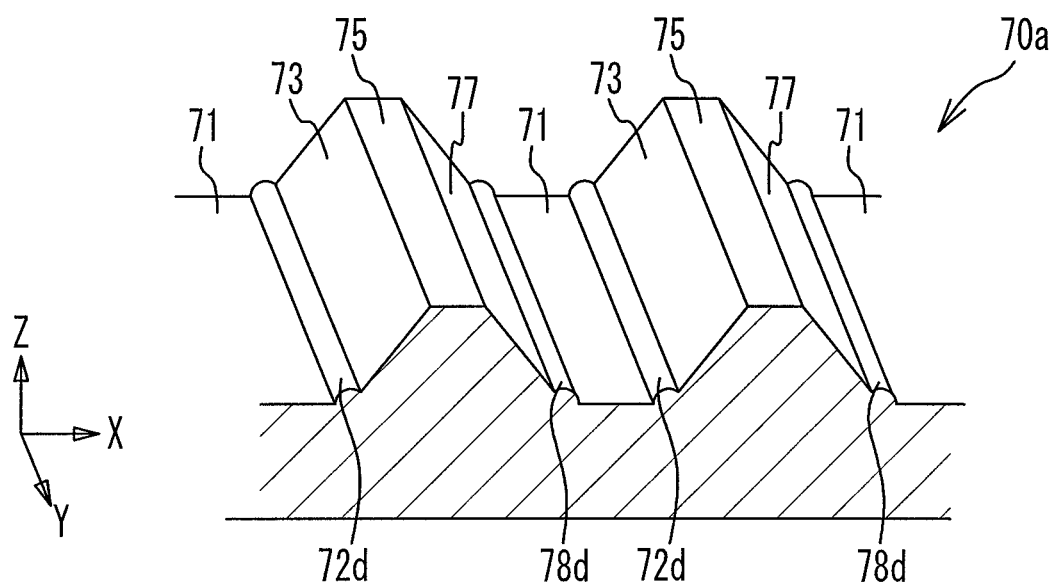
Figure 9A:
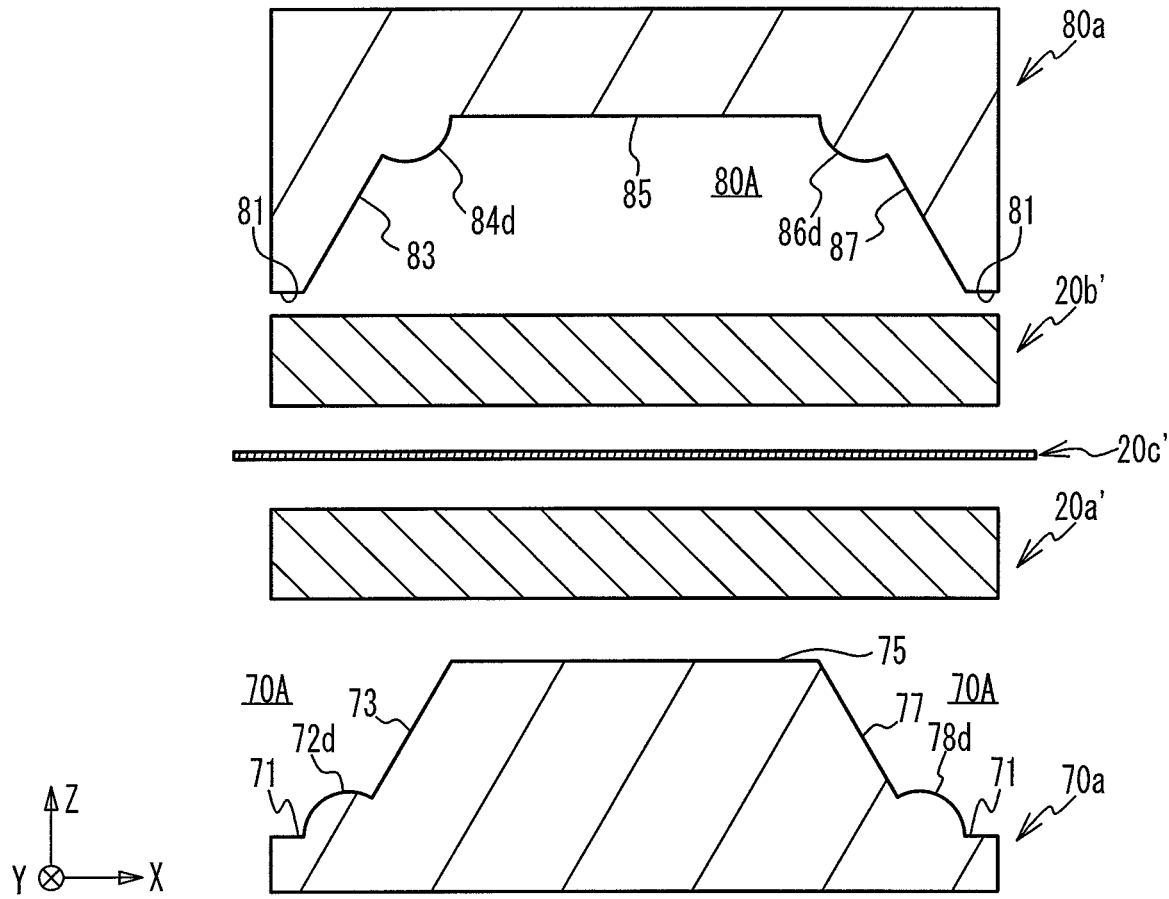
FIGS. 9A and 9B are explanatory views of a manufacturing method of the separator by use of the dies according to the fifth variation.
Figure 9B:
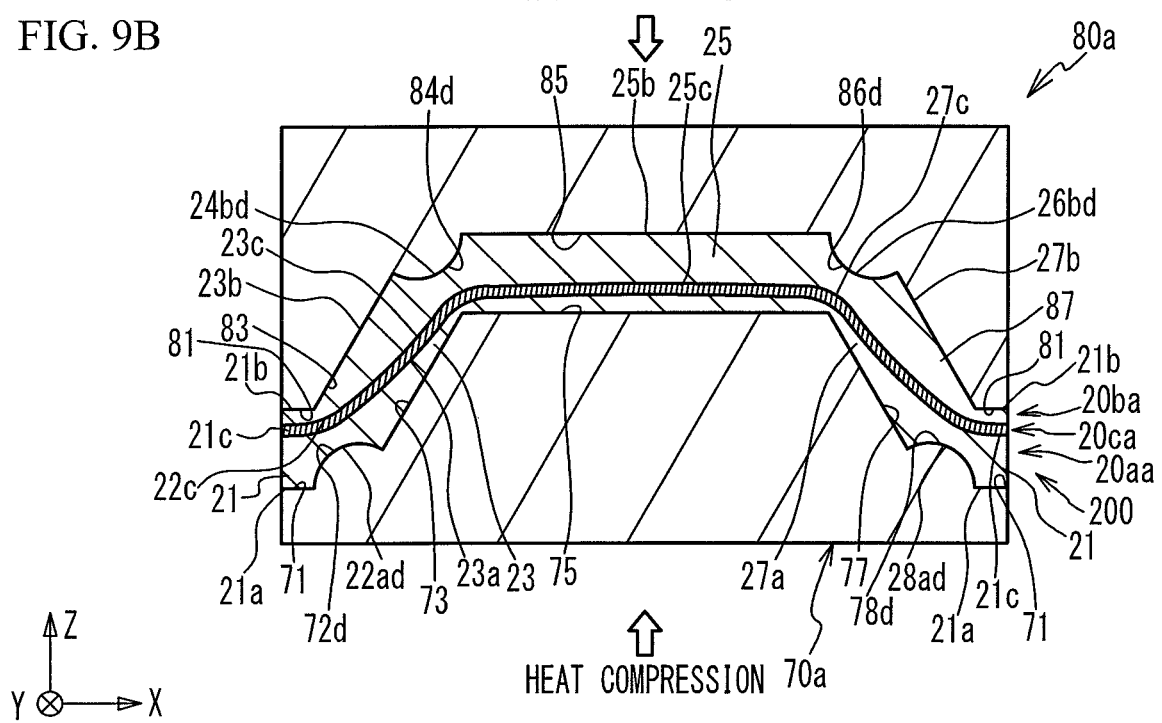

Next, a manufacturing method of the separator 200 will be described. The order of the manufacturing steps of the separator 200 is the same as the order illustrated in FIG. 3, and the description is omitted. Further, the description of the same steps as those of the above manufacturing method of the separator 20 is omitted. FIGS. 8A and 8B are partially enlarged views of the dies 80a and 70a according to the fifth variation. FIGS. 9A and 9B are explanatory views of the manufacturing method of the separator 200 by use of the dies 80a and 70a according to the fifth variation.

As illustrated in FIGS. 8A and 8B, the die 80a is provided with protruding portions 84d and 86d, and the die 70a is provided with protruding portions 72d and 78d. The protruding portion 84d is formed across a boundary portion between the side surface 83 and the concave surface 85 adjacent to each other. The protruding portion 86d is formed across a boundary portion between the concave surface 85 and the side surface 87 adjacent to each other. The protruding portion 72d is formed across a boundary portion between the concave surface 71 and the side surface 73 adjacent to each other. The protruding portion 78d is formed across a boundary portion between the side surface 77 and the concave surface 71 adjacent to each other. Therefore, the protruding portions 72d and 84d are distant from each other in the X direction. The same applies to the protruding portions 86d and 78d. The protruding portions 72d, 78d, 84d, and 86d each has a shape smoothly curved in a cross-sectional view perpendicular to the Y direction. The protruding portions 72d, 78d, 84d, and 86d respectively correspond to the recessed portions 22ad, 28ad, 24bd, and 26bd.

When the hot pressing starts, the resin sheets 20a' and 20b' and the metal plate 20c' are further deformed along the shapes of the dies 70a and 80a as the dies 70a and 80a further come close to each other. Further, a gap between each of the protruding portions 72d and 78d and the die 80a, and a gap between each of the protruding portions 84d and 86d and the die 70a are each smaller than a gap between other portions. Thus, the regions of the metal plate 20c' in the above gaps are positionally defined between the dies 70a and 80a. Further, since the protruding portions 72d and 84d are distant away from each other in the X direction, the angle and the position of the region of the metal plate 20c' between the protruding portions 72d and 84d in the X direction are adjusted. Likewise, the angle and the position of the region of the metal plate 20c' between the protruding portions 78d and 86d in the X direction are adjusted. This suppresses variations in the deformation and variations in the position of the metal plate 20c' in the hot pressing. As a result, the metal plate 20ca having the shape illustrated in FIG. 7 is formed as illustrated in FIG. 9B. Further, the protruding portions 72d and 84d are positioned near the side region 23c the deformation amount of which is large in the hot pressing, and the protruding portions 78d and 86d are also positioned near the side region 27c, thereby effectively suppressing variations in the deformation and variations in the position of the metal plate 20c. Moreover, the resin sheets 20a' and 20b' are deformed and compressed to form the resin layers 20aa and 20ba each having the shape illustrated in FIG. 7, as illustrated in FIG. 9B.

As described above, the protruding portion 72d defines both positions of the convex region 21c and the side region 23c of the completed metal plate 20ca. Likewise, the protruding portion 84d defines both positions of the side region 23c and the convex region 25c, the protruding portion 86d defines both positions of the convex region 25c and the side region 27c, and the protruding portion 78d defines both positions of the side region 27c and the convex region 21c. In such a manner, the four protruding portions 72d, 78d, 84d, and 86d positionally define the regions of the metal plate 20ca. It is thus possible to effectively suppress variations in the position of any region of the metal plate 20ca.

Further, as illustrated in FIG. 9B, the protruding portions 84d and 86d sandwich the resin layer 20ba of the convex portion 25 in the X direction. This suppresses the amount of the resin sheet 20b' partially flowing to the gap between the convex surface 81 and the metal plate 20c' from the gap between the concave surface 85 and the metal plate 20c' in the hot pressing. In particular, since the protruding portions 84d and 86d are continuously formed in the Y direction as illustrated in FIG. 8A, the resin sheet 20b' is further suppressed from partially flowing in such a manner. This ensures the density of the conductive particles in the resin layer 20ba of the convex portion 25. Moreover; the distant between the protruding portions 84d and 86d in the X direction is smaller than that between the protruding portions 83d and 87d illustrated in FIG. 5B, thereby further ensuring the density of the conductive particles in the resin layer 20ba of the convex portions 25.

The size of the protruding portion 72d is not particularly limited, but a height thereof is needed so as not to come into contact with the metal plate 20c' in the hot pressing. The shape of the protruding portion 72d is not limited to the above shape, and may be a polygonal shape such as a triangular shape in a cross-sectional view perpendicular to the Y direction. Likewise, the positions, the sizes, and the shapes of the protruding portions 78d, 84d, and 86d are not limited to the examples described above. Further, such a protruding portion may be provided only in one of the dies 70a and 80a. Only one of the protruding portions 72d and 78d may be provided in the die 70a. Only one of the protruding portions 84d and 86d may be provided in the die 80a. The side surfaces 73, 77, 83, and 87 are flat, but at least one thereof may be curved. In the die 701 according to the first variation, instead of the protruding portion 73d or 83d, the protruding portion 72d or 84d in the fifth variation may be adopted. The protruding portions 72d in the fifth variation may be provided in a predetermined interval in the Y direction, like the protruding portion 73d' in the fourth variation.

The separator manufactured by the above manufacturing method is not limited to a water-cooled type fuel cell using a liquid as a coolant, and may be adopted in, for example, an air-cooled fuel cell using air as a coolant.

Although some embodiments of the present invention have been described in detail, the present invention is not limited to the specific embodiments but may be varied or changed within the scope of the present invention as claimed.

What is claimed is:

1. A manufacturing method of a separator for a fuel cell, comprising:
    setting a metal plate and first and second electro-conductive resin sheets between first and second dies such that the first electro-conductive resin sheet is set between the first die and the metal plate, that the second electro-conductive resin sheet is set between the second die and the metal plate, and that the metal plate having a plate shape is set between the first and second electro-conductive resin sheets, the first die including: a first convex surface and a first concave surface; and a first side surface connected between the first convex surface and the first concave surface, the second die including: a second concave surface and a second convex surface respectively facing the first convex surface and the first concave surface; and a second side surface facing the first side surface and connected between the second concave surface and the second convex surface; and
    forming a flow channel in the metal plate and the first and second electro-conductive resin sheets by hot pressing with the first and second dies,
    wherein a first protruding portion protruding from the first side surface is formed on the first side surface and away from the first concave surface,
    wherein a plurality of protruding portions are formed on the first side surface, and
    wherein the plurality of protruding portions are formed at predetermined intervals in a length direction of the first die that is perpendicular to a direction in which the first convex surface and the first concave surface are arranged.

2. The manufacturing method of the separator for the fuel cell of claim 1, wherein when the first and second dies are closest to each other, at least one of a distance between the first convex surface and the second concave surface and a distance between the first concave surface and the second convex surface is smaller than a distance between the first side surface and the second side surface, and as compared with a protruding width of the first protruding portion from the first side surface, a length in a direction perpendicular to a direction in which the first convex surface and the first concave surface are arranged is greater than the protruding width.

3. The manufacturing method of the separator for the fuel cell of claim 1, wherein the first protruding portion is closer to the first convex surface than the first concave surface.

4. The manufacturing method of the separator for the fuel cell of claim 1, wherein when the first and second dies are closest to each other, a distance between the first side surface and the second side surface is greater than a distance between the first concave surface and the second convex surface, and the first protruding portion is closer to the first concave surface than the first convex surface.

5. The manufacturing method of the separator for the fuel cell of claim 1, wherein a second protruding portion protruding from the second side surface is formed on the second side surface.

6. The manufacturing method of the separator for the fuel cell of claim 5, wherein:

the first protruding portion is positioned at a center of the first side surface; and the second protruding portion is positioned at a center of the second side surface.

7. The manufacturing method of the separator for the fuel cell of claim 1, wherein:

a plurality of protruding portions are formed on the second side surface; and the plurality of protruding portions formed on the second side surface are formed at predetermined intervals in a length direction of the second die that is perpendicular to a direction in which the second convex surface and the second concave surface are arranged.

8. A manufacturing method of a separator for a fuel cell, comprising:

setting a metal plate and first and second electro-conductive resin sheets between first and second dies such that the first electro-conductive resin sheet is set between the first die and the metal plate, that the second electro-conductive resin sheet is set between the second die and the metal plate, and that the metal plate having a plate shape is set between the first and second electro-conductive resin sheets, the first die including: a first convex surface and a first concave surface; and a first side surface connected between the first convex surface and the first concave surface, the second die including: a second concave surface and a second convex surface respectively facing the first convex surface and the first concave surface; and a second side surface facing the first side surface and connected between the second concave surface and the second convex surface; and forming a flow channel in the metal plate and the first and second electro-conductive resin sheets by hot pressing with the first and second dies, wherein a first protruding portion protruding from the first side surface is formed on the first side surface and away from the first concave surface, wherein a plurality of protruding portions are formed on the second side surface, and wherein the plurality of protruding portions are formed at predetermined intervals in a length direction of the second die that is perpendicular to a direction in which the second convex surface and the second concave surface are arranged.

* * * * *